United States Patent Office 2,736,750
Patented Feb. 28, 1956

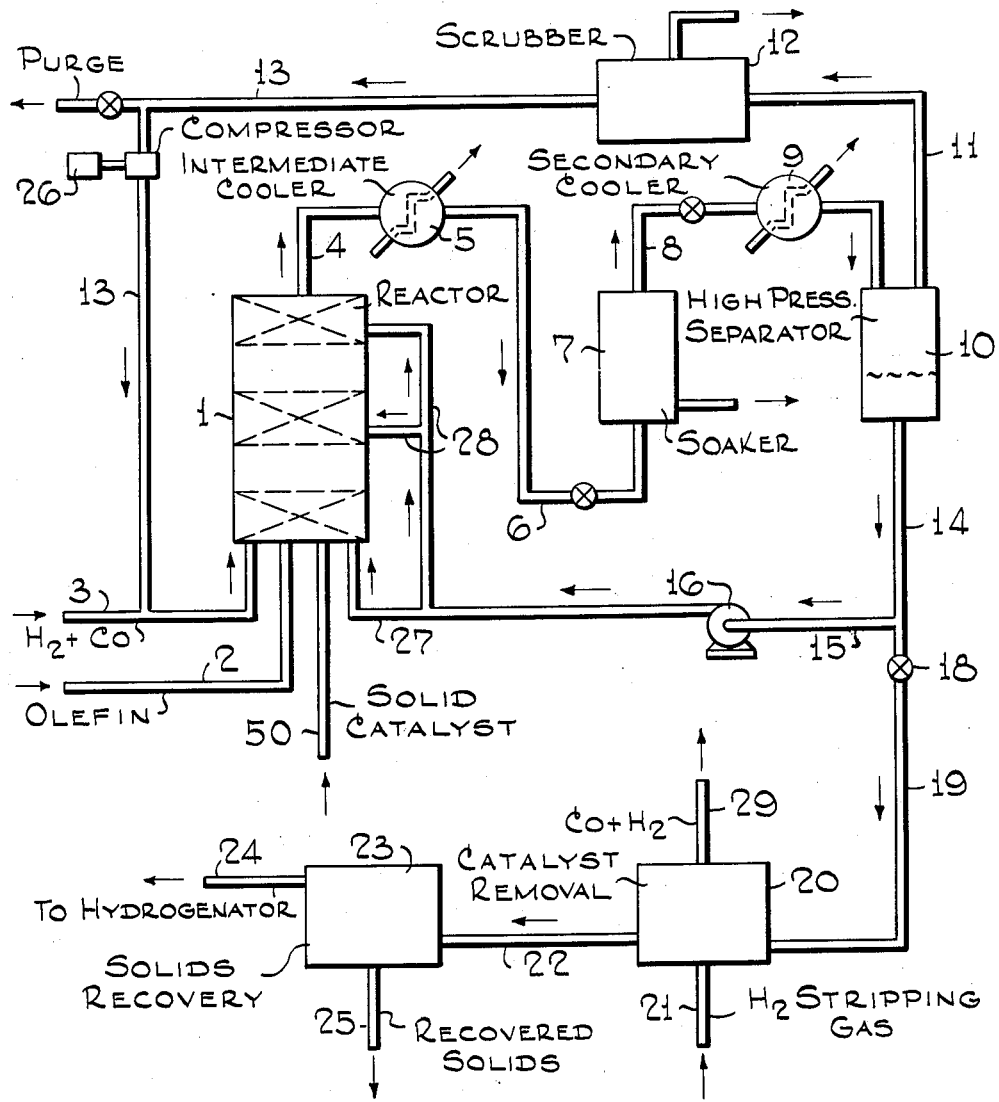

2,736,750

ALDEHYDE SYNTHESIS PROCESS

William E. Catterall, Roselle, N. J., assignor to Esso Research and Engineering Company, a corporation of Delaware Application June 12, 1951, Serial No. 231,129

8 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for maintaining continuously high concentration of active catalyst in the reaction zone.

It is well known in the art that oxygenated organic compounds may be synthesized from organic compounds containing olefinic linkages by a reaction with carbon monoxide and hydrogen in the presence of a catalyst containing metals of the iron group such as cobalt or iron, preferably the former, in an essentially three-stage process. In the first stage the olefinic material, catalyst and proper proportions of CO and $H_2$ are reacted to give a product consisting predominantly of aldehydes containing one more carbon atom than the reacted olefin. This oxygenated organic mixture which contains dissolved in it, compounds such as the carbonyls and the molecular complexes of the metal catalysts, is treated in the second stage to cause removal of soluble metal compounds from the organic material in a catalyst removal zone. The catalyst-free material is then generally hydrogenated to the corresponding alcohols or it may be oxidized to the corresponding acids.

This carbonylation reaction provides a particularly attractive method for preparing valuable primary alcohols which find large markets, particularly as intermediates for plasticizers, detergents and solvents. Amenable to the reaction are long and short chain olefinic compounds, depending upon the type alcohols desired. Not only olefins, but most organic compounds possessing at least one aliphatic carbon-carbon double bond may be reacted by this method. Thus, straight and branch chain olefins and diolefins such as propylene, butylene, pentene, hexene, butadiene, pentadiene, styrene, olefin polymers such as those obtained by catalytic polymerization of propylene and butylene, etc., polypropylene, olefinic fractions from the hydrocarbon synthesis process, thermal or catalytic operation, and other sources of hydrocarbon fractions containing olefins, may be used as starting material, depending upon the nature of the final product desired.

The catalyst in the first stage of the process may be added in the form of salts of the catalytically active metal with high molecular weight fatty acids such as stearic, oleic, palmitic, naphthenic, etc. Thus, suitable catalysts are, for example, cobalt oleate or naphthenate. These salts are soluble in the liquid olefin feed or in the liquid products from the reaction and may be supplied to the first stage as hydrocarbon solution or dissolved in the olefin feed or in a stream of recycle products. Also, it has been proposed to employ catalyst deposited on a carrier, preferably activated with thoria, in the form of a slurry and employ the supported cobalt material in the slurry rather than the metal soap. It has also been proposed to employ other insoluble forms of cobalt such as cobalt oxide, carbonate, etc. Though this type of catalyst is considerably cheaper and more economical than the oil-soluble soaps or than the supported cobalt metal on a carrier, the employment of this type of cobalt compound has, in the past, not been commercially feasible for reasons disclosed more fully below.

The synthesis gas mixture fed to the first stage may consist of any desired ratio of $H_2$ to CO, but preferably, these gases are present in about equal volumes. The conditions for reacting olefins with $H_2$ and CO vary somewhat in accordance with the nature of the olefin feed. But the reaction is generally conducted at pressures in the range of about 1500 to 4500 p. s. i. g. and at temperatures of about 300° to 400° F. The ratio of synthesis gas to olefin feed may vary widely, in general about 2500 to 15,000 cubic feet of $H_2+CO$ per barrel of olefin feed are employed.

At the end of the first stage when the desired conversion of olefins to oxygenated compounds has been effected, the product and the unreacted material are generally withdrawn to a catalyst removal zone where dissolved catalyst is removed from the mixture and it is to the processing of the stream withdrawn from the aldehyde synthesis zone that the present invention applies.

It has been reasonably well substantiated that the active species of the catalyst is a carbonyl of the metal, probably the hydrocarbonyl. Thus, when cobalt is added as an insoluble solid or as a solution of a metallic soap, it has been found that cobalt carbonyl is always formed and when cobalt carbonyl is added to the reaction, cobalt material is obtained after the reaction is completed and the product decobalted. There are, however, vast differences in reaction rates between the various forms of cobalt. A cobalt soap is converted into cobalt carbonyl at a considerably faster rate than is a hydrocarbon-insoluble form of cobalt such as either metal or cobalt oxide. Accordingly, when an insoluble form of cobalt is employed as a catalyst, it requires a considerably longer residence time for the formation of the active catalyst than does the utilization of the more easily converted cobalt soap and when it is desired to employ these insoluble forms of catalyst and use at the same time, liquid and gas throughput rates that are feasible with soluble cobalt soap in a continuous reaction, it has been found that a large proportion of the solid insoluble cobalt passes through the reaction zone without being converted at the reaction conditions, into cobalt carbonyl. This cobalt would have to be recovered, particularly in view of the present cobalt shortage, and represents a significant loss in reactor capacity as well as additional equipment necessary for the recovery of cobalt. It is, therefore, evident that it would be highly desirable to provide a process for employing solid, readily available sources of cobalt such as cobalt oxide which would react to form cobalt carbonyl at equivalent rates to those of oil-soluble cobalt compounds.

A related problem as to the rate of formation of cobalt carbonyl arises, even with the employment of oil soluble catalyst. It has been determined that highest conversion of olefins to aldehydes is obtained when reaction temperatures are maintained at the upper level of the preferred range which is about 340° to 360° F. However, under those conditions there is a pronounced tendency of cobalt carbonyl to decompose into carbon monoxide and metallic cobalt. This is probably due to the temperature of the equilibrium reaction for the aldehyde formation being above the cobalt carbonyl decomposition temperature at the high pressures employed. Accordingly, effluent from the aldehyde synthesis zone, even when cobalt is originally introduced as an olefin-soluble soap, contains substantial amounts of finely divided metallic cobalt dispersed in the mixture. Also, as a result of secondary reactions occurring during the aldehyde synthesis reaction, significant quantities of cobalt formate and basic cobalt formate are formed which are also insoluble in the olefinic medium.

Thus, the problem inherent in a liquid phase aldehyde synthesis process in which the catalyst is supplied either as an oil-soluble soap of the carbonylation metal or as an oil-insoluble compound, is the conversion of such catalytically inactive compound into the active species of the catalyst. It is known that there is a definite time lag within the reactor which is required to convert the inactive form of the catalyst to the active species, that is, to the carbonyl. And in a continuous process in which olefins and catalyst are added to the bottom of the reactor in order to afford the longest possible time of contact of the catalyst with the olefin, the actual interaction of the cobalt carbonyl and the olefin feed does not occur immediately because the cobalt carbonyl has first to be synthesized by interaction of carbon monoxide in the feed gas with the catalyst salt dissolved in the olefin feed. Thus, a portion of the reactor required for carbonyl formation plays no part in the catalytic conversion of the olefins to aldehydes.

One good method for controlling the heat of reaction and for providing active catalyst in the lower portion of the reactor is to recycle a portion of the first stage Oxo product (i e. aldehyde containing cobalt carbonyl in solution), after cooling and separation of the gases in a high pressure separator. This aldehyde product has a much higher heat capacity than an equivalent volume of gas and hence a substantially smaller amount is required for recycling. Also, since the aldehyde recycled contains dissolved catalyst, recycle of this material to the lower portion of the first stage reaction zone increases the concentration of the catalytic material near the reactor inlet where it is capable of accomplishing to some degree, olefin conversion, before fresh cobalt catalyst introduced to the reactor dissolved or suspended in the fresh feed, is converted to cobalt carbonyl and is able to function as a catalyst. This process, however, though a step forward, has the disadvantage of recycling to the reactor inlet, an aliquot portion of the solid cobalt that is withdrawn with the aldehyde effluent and hence, performs no useful function in the process.

It is one of the objects of the present invention to provide an improved process for maintaining high concentration of cobalt carbonyl in an aldehyde synthesis reaction zone.

It is also a purpose of the present invention to provide a process for employing oil insoluble cobalt catalysts which may be converted to provide carbonyl in high concentrations and to maintain cobalt carbonyl in high concentrations throughout the reactor.

Other and further objects and advantages of the invention will in part be obvious and will in part appear hereinafter.

These objects and advantages may in brief compass, be achieved by converting the entire cobalt content of the reactor effluent to the soluble catalytic form by means of soaking the entire reactor effluent at aldehyde synthesis pressures, i. e. the same pressures obtaining in the aldehyde synthesis zone, but at a temperature which is lower than normal aldehyde synthesis reaction temperatures. It has now been found that the conversion of solid cobalt to cobalt carbonyl proceeds at a considerably higher rate when the temperature is maintained at about 200° to 300° F. than at the higher temperatures of the aldehyde synthesis reaction proper. In accordance with the present invention, therefore, the total reactor effluent is passed through a soaker prior to separation of the dissolved gases from the synthesis product. Following the soaking stage, the effluent may be further cooled, liquid and gas separated, and a portion of the cooled liquid now containing high concentrations of cobalt carbonyl is recycled to the reactor for supplying cooling medium. As a result of having converted all the insoluble cobalt to the carbonyl, there is served the two-fold purpose of improving the olefin conversion in the aldehyde synthesis reactor and the ease of the subsequent decobalting of the total aldehyde product formed. Thus, in accordance with the present invention, solid unreacted forms of cobalt produced either by decomposition of cobalt carbonyl or resulting from non-reaction of solids introduced originally into the reactor, are withdrawn along with the aldehyde product from the aldehyde synthesis zone, and converted at the same pressures but at temperatures somewhat lower than those obtaining in the synthesis zone to cobalt carbonyl. The enriched material is then cooled to about 60° to 120° F. and a portion of the cobalt carbonyl-rich product is recycled to the aldehyde synthesis zone to provide both cooling and active form of the catalyst.

The present invention will best be understood from the more detailed description presented hereinafter wherein reference will be made to the accompanying drawing which is a schematic illustration of a system suitable for carrying out a preferred embodiment of the invention.

Referring now to the diagram, an olefinic hydrocarbon having one carbon atom less than the number of carbon atoms in the desired resulting oxygenated compound is fed through feed line 2 to the bottom portion of primary reactor 1. Reactor 1 comprises a reaction vessel which may, if desired, be packed with noncatalytic material such as Raschig rings, porcelain chips, pumice and the like. The reactor is preferably divided into discrete packed zones separated by any suitable means such as support grids though, if desired, it may contain but a single packed vessel or it may contain no packing.

Though the olefinic compound may contain dissolved therein, 1 to 3% by weight of cobalt oleate based on the olefin, the invention finds its most useful application when a solid olefin-insoluble catalyst is employed. Accordingly, along with the olefin feed there may be added in suspension, a solid olefin-insoluble form of cobalt such as cobalt metal, cobalt oxide, carbonate, formate, basic carbonate, or other readily available form of this metal. This material may be added in suspension or may be separately injected through line 50. However, instead of being suspended, the solid cobalt metal may be injected in the form of a paste or in the form of a colloid. A good method of starting up the operation is to inject into the aldehyde synthesis reactor, the olefin containing dissolved therein 1 to 3% by weight of cobalt oleate or naphthenate, based on the olefin and then as the run proceeds the dissolved cobalt is gradually cut back and the solid catalyst is injected. When a paste is employed, such may be prepared by mixing finely ground cobalt with about 50% by weight of petrolatum. A system suitable for paste injection may comprise a pair of blow cases or feed cylinders, each of which is filled periodically with paste while the other is being discharged to the reactor by suitable gas pressure.

Simultaneously, a gas mixture containing hydrogen and carbon monoxide in the approximate ratio of 0.5 to 2 volumes of $H_2$ per volume of CO is supplied through line 3 to primary reactor 1 and flows concurrently through reactor 1 with liquid olefin feed and dispersed catalyst. Reactor 1 is preferably operated at pressures of about 2500 to 3500 p. s. i. g. and at temperatures of about 275° to 450° F., preferably 300° to 375° F., depending upon the olefin feed and other reaction conditions. The rate of flow of olefins through reactor 1 is about 0.1 to 1.5 v./v./hr. As a result of the reaction between cobalt and the synthesis gas, cobalt carbonyls are formed and it is commonly believed to be the hydrocarbonyl which catalyzes the conversion of olefins to aldehydes. However, as discussed above, there is a time lag running from the introduction of the carbon monoxide, hydrogen and the cobalt in whatever form it is added, to the formation of the cobalt carbonyl. This time lag is somewhat less when an oil-soluble form of cobalt is employed than when an oil-insoluble form is employed, probably resulting from the smaller contact surface available in the latter case. Also, because of the high temperatures necessary to obtain satisfactory conversion, cobalt carbonyl formed in an intermediate part of reaction zone 1 tends to be in part decomposed to metallic cobalt in the upper section of reactor 1.

The carbonylation reaction in reactor 1 is carried out substantially adiabatically, that is, no external cooling means such as tubes or coils is provided, but the cooling and temperature control is carried out by recycling cooled product as disclosed more fully below.

Liquid oxygenated reaction products comprising aldehydes and carrying in suspension, finely divided cobalt metal or other form of cobalt, are withdrawn from the upper portion of high pressure reactor 1 through line 4. The product which is at a temperature of about 350° to 375° F. and at a pressure of about 3000 p. s. i. g. is then passed to cooler 5 wherein the total effluent is cooled to a temperature of about 150° to 300° F., preferably 200° to 250° F., and thence passed by line 6 to the bottom of soaker vessel 7, which may be a suitable vessel with or without packing and is of size adequate to allow a residence time of about 1 to 60 minutes, preferably 5–30 minutes. The conditions within soaking vessel 7 comprise pressures of the same order of magnitude as those obtaining in reactor 1, namely, about 3000 pounds and a temperature above 150° but below 300° F., preferably between 200° and 250° F. The hydrogen and carbon monoxide gas dissolved and accompanying the liquid effluent from reactor 1 is preferably not disengaged prior to passage of the aldehyde products through the soaker in order to maintain an adequate supply of gas necessary for the reaction of the unreacted solid with CO and $H_2$ to produce cobalt carbonyl.

After sufficient soaking, aldehyde product, now containing only negligible amounts of solid cobalt in suspension and rich in cobalt carbonyl is withdrawn from the upper portion of soaker 7 and passed via line 8 to cooler 9 wherein the material is cooled to about 60° to 120° F. and thence is passed, without significant pressure release, to high pressure separator 10. In zone 10, separation of unreacted gases from liquid product occurs. The unreacted gases may be withdrawn overhead through line 11, scrubbed in scrubber 12 of entrained liquid and catalyst, and used in any way desired. They may be purged or preferably, they may be recycled through compressor 26 and line 13 to the synthesis gas feed line 3. Liquid aldehyde product containing high concentration of cobalt carbonyl is withdrawn from high pressure separator 10 through line 14. A liquid level is maintained in separator 10.

A stream of liquid aldehyde product containing dissolved therein, relatively high concentrations of cobalt carbonyl is then withdrawn through line 14 and a portion of this stream is passed via line 15 and booster pump 16 to the aldehyde synthesis reactor to supply both cooling and high cobalt carbonyl concentration throughout the reactor. The amount of product recycled is a function of the amount of cooling required in the reactor, the temperature gradient throughout the reactor being in the range of from about 30° to 100° F. The cooled recycle product from high pressure separator 10 is at a temperature level about 200° to 250° F. lower than that maintained in reactor 1. The cobalt carbonyl thus added along with the olefin feed accelerates aldehyde reaction throughout the full length of the reactor. Thus, it is preferred to add the recycled aldehyde product not only at the bottom portion of reactor 1 through line 27, wherein there is a deficiency due to the heretofore described reaction time lag, but also, to the intermediate and upper portions, through line 28, in order to supply the deficiency resulting from decomposition of cobalt carbonyl formed intermediately. Thus, the recycled aldehyde product is preferably injected throughout the length of the aldehyde synthesis reactor 1. Approximately a total of 100 to 700 volumes percent of liquid aldehyde product on the fresh olefin feed may be used for this purpose.

Liquid aldehyde product not recycled to reactor 1 may be withdrawn through pressure release valve 18 and through line 19. The product comprises any unreacted olefin as well as aldehydes, secondary reaction products and dissolved catalyst compounds, but as a result of operating in accordance with the present invention, is substantially free of suspended or solid catalyst material. This liquid is then passed through line 19 to catalyst removal zone 20 wherein, by suitable heat treatment at about 200° to 400° F. and pressure of atmospheric to 500 pounds and in the presence of an inert vapor, gas, steam or acid, the dissolved catalyst, i. e. cobalt carbonyl, is converted by thermal or chemical means into cobalt metal or other oil-insoluble form of cobalt. Thus a stream of hydrogen may be admitted to catalyst removal zone through line 21, the purpose of such hydrogen being to aid in the stripping and removing of evolved carbon monoxide from catalyst removal zone 20. The gas stream comprising hydrogen and CO produced by decomposition of cobalt carbonyl, may be removed from zone 20 through line 29 and transferred to another portion of the system for further use.

Liquid aldehyde reaction product now substantially free of carbonylation catalyst is withdrawn from catalyst removal zone 20 through line 22 to a solids recovery zone 23, wherein solid cobalt formed as a result of the thermal or other treatment in vessel 20, is recovered either by settling, filtration, or other known means. The metal-free liquid product is then withdrawn through line 24 for further processing, preferably to produce alcohols by hydrogenation in a manner known per se. Recovered metal and cobalt solid may be withdrawn from solids recovery system 23 through line 25 and is preferably reused in the process either by suspending the same in the olefin feed or by forming a paste therewith, or if desired, converting it into an oil-soluble olefin soap.

The process of the invention admits of numerous modifications apparent to those skilled in the art. It has already been pointed out that though the process of the invention finds its highest utility with the employment of olefin-insoluble carbonylation catalyst, oil-soluble catalysts may also be used. Also, under certain circumstances, it may be desirable to inject aqueous solutions of water-soluble carbonylation catalyst. The catalyst decomposition zone may be operated either to decompose cobalt carbonyl to solid cobalt or cobalt oxide, carbonate, or basic formate; or cobalt carbonyl may be decomposed in the catalyst decomposition zone by means of a stream of hot water or steam whereby the cobalt carbonyl is converted into water-soluble and water-insoluble cobalt compounds, including cobalt formate and cobalt basic formate. Solvents for liquid and gaseous olefins may be employed in the primary reaction stage and the cobalt solids which may be added to the first stage may advantageously be added thereto in the form of a slurry in a liquid medium, which medium is the bottoms product resulting from the distillation of alcohols from the hydrogenation stage. If desired, additional solid cobalt or the entire amount of fresh catalyst or externally recycled solid catalyst may be added to soaker 7 to provide additional quantities of cobalt carbonyl for recycle to the reaction zone.

The process of the present invention may be further illustrated by the following examples.

*Example I*

To show the incompleteness of conversion of solid forms of cobalt when employed under reaction conditions which would result in substantially complete conversion of an oil-soluble cobalt compound into cobalt carbonyl, the following data are relevant. Run "A" is representative of the reaction conditions and results obtained commercially wherein a heptene fraction is converted into octyl aldehyde and alcohol employing cobalt oleate as a catalyst. In run "B" cobalt oleate was replaced by an equivalent amount of oil-insoluble cobalt oxide. The runs were carried out at about 3000 p. s. i. g. total pressure.

|  | A | B |
|---|---|---|
| Feed Rate, V./V./Hr. | 0.80 | 0.80. |
| Conversion, Percent | 78.0 | 40. |
| Synthesis Gase Rate, C. F./B. | 6,500 | 6,400. |
| H₂ to CO Ratio | 1.2 | 1.3. |
| Oven Temperature, ° F. | 348 | 343. |
| Catalyst, Wt. Percent Co on Feed | 0.28 | 0.3. |
| Decobalting | Excellent | Poor. |

The above data clearly show that with the employment of solid cobalt oxide as catalyst under conditions wherein the cobalt oleate catalyst was substantially completely converted to cobalt carbonyl and an olefin conversion of 78% was obtained, the equivalent amount of cobalt as cobalt oxide gave only a 40% conversion. Furthermore, it was found that cobalt oxide was washed through the reactor oven before it could be converted to the cobalt carbonyl form. This was evident from the presence of black particles of cobalt oxide. These black particles were found not only in the effluent from the aldehyde synthesis reactor but also, in the effluent from the decobalter. The decobalting, when cobalt oxide was employed as the catalyst under these conditions, was quite poor. These data point out clearly, the fact that the residence time of cobalt oxide and other solid forms of cobalt, in order for the equivalent amount of cobalt carbonyl and olefin conversion to be obtained as in the case of the oil-soluble cobalt compound must be considerably longer. This is provided for by the soaker of the present invention.

*Example II*

It has been pointed out above that as the temperatures increase, the amount of soluble cobalt in the effluent from the reactor decreases. As it was pointed out, at the higher temperatures, a part of the dissolved cobalt carbonyl is decomposed into an insoluble form of cobalt which is in part retained in the oven and in part removed in a colloidal and insoluble form. Thus, the following table indicates the decrease in the amount of dissolved cobalt appearing in the effluent from the aldehyde synthesis reactor as the temperature rises. Under all conditions the same C₇ olefin fraction is converted under substantially the same conditions which include a pressure of 3000 pounds, a 1.1/1 H₂ to CO ratio synthesis gas and a feed rate of 0.6 v./v./hr. The catalyst dissolved in the entering feed in all cases is 1.3% by weight of cobalt naphthenate.

| Temperature, ° F. | Percent Cobalt in Aldehyde Product Effluent |
|---|---|
| 320 | 0.17 |
| 330 | 0.12 |
| 340 | 0.09 |
| 350 | 0.07 |
| 360 | 0.06 |
| 370 | 0.04 |

These data show clearly that as the temperature rises from the normal operating temperatures to the higher temperatures, which higher temperatures generally favor high conversion rates, the amount of cobalt carbonyl present in the liquid decreases, due to decomposition of the cobalt carbonyl and at the higher temperatures, the amount of cobalt in the effluent is considerably less than that present in the entering feed.

*Example III*

The soaker of the present invention is operated at temperatures preferably between about 200° and 250° F. and substantially below the aldehyde synthesis reaction temperatures of 300° to 360° F. The criticality of this range is shown in the following experiments wherein solid cobalt material obtained from the decobalter from the large plant was washed with naphtha, ground and screened through 35 mesh and pilled (3/16" pellets). The pills, which analyzed for 37.3% by weight of cobalt, the remainder being iron, carbonaceous material and oxygen, etc., were charged to a reactor, and synthesis gas charged under conditions and with results shown in the following table.

| Period | Temp., ° F. | Total Pressure | Olefin Conv., Percent (est.) | Wt. Percent Cobalt in Product |
|---|---|---|---|---|
| A | 300 | 2,975 | 84 | 0.29 |
| B | 276 | 3,000 | 78 | 0.81 |
| C | 225 | 2,970 | 68 | 3.00 |
| D | 200 | 3,000 | 34 | 2.12 |
| E | 179 | 3,000 | 9 | 0.95 |

These data show clearly that, in the range of between 200° and 300° F., particularly around 225° F., the cobalt carbonyl concentration goes through a maximum, although conversion of olefins to aldehydes in this temperature range is not favored. This, therefore, is the temperature range suitable for converting the solid cobalt particles carried over from the aldehyde synthesis reaction zone with cobalt carbonyl.

*Example IV*

The conditions for maintaining high concentrations of cobalt carbonyl in the aldehyde synthesis reactor effluent product by conversion of solid cobalt entrained and dispersed therein, are shown by the following experiments. A slurry of cobalt oxide in aldehyde product was passed through a steam preheater to bring it to the various temperature levels as shown, and injected into a soaking vessel. Synthesis gas in the approximate ratio of 1:1 was injected and the vessel maintained at about 3000 p. s. i. g., with a linear gas velocity based on the exit gas, of 0.0004 feet per second.

| Average, Temp., °F | 201 | 225 | 249 |
|---|---|---|---|
| Liquid, V./V./Hr | 0.25 | 0.25 | 0.24 |
| Cobalt, Wt. per cent (oxide) | 2.74 | 2.71 | 2.82 |
| Cobalt in Liquid, Wt. per cent | 0.86 | 1.22 | 0.74 |
| Cobalt in Gas, Wt. per cent | 0.03 | 0.03 | 0.03 |

These results show that a relatively short contact time is sufficient to dissolve a high degree of cobalt in the form of cobalt carbonyl from the relatively coarse slow-retacting oxide. Colloidal particles are even more readily converted.

Numerous modifications apparent to those skilled in the art are within the scope of the invention.

What is claimed is:

1. In the process for converting olefins, CO and H₂ into aldehydes in the presence of a cobalt catalyst in a reaction zone under pressures of about 2000 to 4000 p. s. i. g. and at temperatures of about 300° to 375° F. and wherein a liquid aldehyde product containing in suspension, solid oil-insoluble forms of cobalt is withdrawn from said reaction zone and passed to a catalyst removal zone, the improvement which comprises passing said aldehyde product and finely divided cobalt comprising solids and unreacted carbon monoxide and hydrogen to a soaking zone, maintaining in said zone pressures of substantially the same order of magnitude as in said first-named zone, maintaining in said zone temperatures of above 200° and below 300° F., maintaining a residence time of said aldehyde product, cobalt and carbon monoxide and hydrogen for a period conducive to the conversion of said finely divided solid cobalt to cobalt carbonyl, thereafter withdrawing from said zone liquid aldehyde product depleted in solid cobalt and augmented in cobalt carbonyl, passing said aldehyde product and unreacted gases to a gas-liquid separation zone, withdrawing liquid product from said separation zone, and recycling at least a portion of the thus withdrawn liquid aldehyde product augmented in cobalt carbonyl dissolved therein to said first-named zone to provide cooling and active catalyst therein.

2. The process of claim 1 wherein the temperature maintained in said soaking zone is about 225°–250° F.

3. The process of claim 1 wherein said cobalt-containing recycled aldehyde product is injected into said first-named reaction zone at a plurality of points spaced in the direction of flow of said reaction products through said reaction zone.

4. The process of claim 1 wherein an oil-soluble cobalt soap is originally added to said first-named reaction zone and said solid, oil-insoluble cobalt is said withdrawn aldehyde product results from decomposition of cobalt carbonyl formed within said reaction zone.

5. The process of claim 1 wherein an oil-insoluble form of cobalt is originally added to said first-named reaction zone and said solid, oil-insoluble material is only partially converted to cobalt carbonyls in said reaction zone.

6. The process of claim 5 wherein said oil-insoluble cobalt added to said first-named zone is cobalt oxide.

7. The process of claim 5 wherein said oil-insoluble cobalt added to said first-named reaction zone is obtained from a catalyst decomposition zone.

8. The process of claim 1 wherein said aldehyde product withdrawn from said first-named reaction zone is cooled prior to passing to said soaking zone.

References Cited in the file of this patent

UNITED STATES PATENTS

| | | |
|---|---|---|
| 2,464,916 | Adams et al. | Mar. 22, 1949 |
| 2,497,303 | Gresham et al. | Feb. 14, 1950 |
| 2,557,701 | Smith | June 19, 1951 |
| 2,571,160 | Parker et al. | Oct. 16, 1951 |
| 2,587,858 | Keulemans | Mar. 4, 1952 |

FOREIGN PATENTS

| | | |
|---|---|---|
| 644,665 | Great Britain | Oct. 18, 1950 |
| 657,526 | Great Britain | Sept. 19, 1951 |

OTHER REFERENCES

Adkins et al.: J. Amer. Chem. Soc., vol. 70, January 1948, pp. 383–386.